United States Patent [19]

Cotugno

[11] Patent Number: 4,737,097

[45] Date of Patent: Apr. 12, 1988

[54] CONCRETE SLAB SURFACE FINISHING TOOL

[76] Inventor: Joseph A. Cotugno, 7360 Blacklick Eastern Rd., Pickerington, Ohio 43147

[21] Appl. No.: 61,491

[22] Filed: Jun. 15, 1987

[51] Int. Cl.[4] ........................ B28B 17/00; B29C 59/02

[52] U.S. Cl. .................................. 425/458; 15/235.4; 15/235.7

[58] Field of Search ..................... 425/458; 15/104.94, 15/105.5, 235.4, 235.5, 235.7

[56] References Cited

U.S. PATENT DOCUMENTS

| | | | |
|---|---|---|---|
| 761,242 | 5/1904 | Meyers | 15/235.7 |
| 855,633 | 6/1907 | Herring | 425/458 |
| 1,005,964 | 10/1911 | Grundy | 15/105.5 |
| 2,526,401 | 10/1950 | Oscar | 15/235.8 |

FOREIGN PATENT DOCUMENTS

| | | | |
|---|---|---|---|
| 373891 | 1/1964 | Switzerland | 15/235.7 |

*Primary Examiner*—Willard Hoag
*Attorney, Agent, or Firm*—Robert B. Watkins; Daniel H. Dunbar

[57] ABSTRACT

A concrete slab hand finishing tool is provided with, in combination, a flat floor surface working area, a lip offset surface working area joined to the flat floor surface working area, a flat lip surface working area joined to lip offset working area, and an edge surface working area joined to the flat lip surface working area.

7 Claims, 1 Drawing Sheet

CONCRETE SLAB SURFACE FINISHING TOOL

TECHNICAL FIELD

This invention relates generally to concrete slab surface finishing, and particularly concerns an improved hand tool for finishing the edge of a concrete slab surface of the type having an integral doorway lip.

BACKGROUND OF THE INVENTION

It is commonplace in some regions and in some instances to provide concrete slabs used as floors with a depressed integral lip at the side of surface that co-operates at a later time with an overhead door. The depressed lip prevents surface water from flowing through the door opening onto the more elevated concrete slab finished surface floor.

In finishing concrete slabs of this type, it has been the common practice to screed (i.e. scraping by lateral side movement with a blade) concrete mix from the depressed lip of the slab and afterwards finish the lip surface area by successively troweling the elevated floor with an edging tool and then troweling the edge of the depressed lip with an edging tool, in separate operations using the screed tool as an edging base. Afterwards, it is necessary in a separate step to finish the surface of the depressed lip area.

Each of these three operations is done by hand and the final product is subject to the degree of skill of the operator of the edging tool. The skills are complicated since judgment is required to determine the degree of "set" in the concrete for the proper time to do a good edging and lip surface finishing job. Even with the most skilled, uniformity is not perfect when the separate operations are conducted sequentially.

I have discovered that the operation of providing an integral lip area in a concrete slab door opening may be simplified and several steps eliminated by using a novel hand tool in accordance with the present invention.

Others have sought to simplify concrete finishing edging operations by providing special tools for special shapes, as shown by prior art inventions.

U.S. Pat. No. 1,564,172, Busch, shows a cement finishing trowel which is capable of adjustment by elastic deformation of the finishing surface through adjustment of the handle bolts which determine the length of the finishing surface and therefore the curvature that may be achieved. The purpose of the deformation in this patent is to provide a single variable curb or contoured elevation change. There is no recognition of the multiple levels of mating surfaces that must be maintained. The handle is supported at the ends and perpendicular to the plane of travel and on a line perpendicular to the plane of travel of the tool, making orientation difficult in the line of travel of the tool.

U.S. Pat. No. 1,744,097, Baker et al, shows a mason's molding trowel wherein a relatively complicated molded edge may be provided on the conventional edging tool that is used in concrete finishing. The handle is located in an offset position from the edging operation as is commonly found in a concrete edging tool.

These prior art tools do not meet the needs of the practitioner that are required in situations such as providing the lip on a garage floor surface to receive the garage door and provide a sill. Although there has been a long felt need for a single tool combining all of the features necessary to provide a finished and uniform sill and edge surfaces, the common practice remains to do it in three separate steps with one single edging tool.

SUMMARY OF THE INVENTION

To achieve the objects of this invention, I provide a novel hand tool having a working surface made from a continuous sheet metal element provided with several working features. The working features, in succession, are a slab edge finishing portion, a lip surface finishing portion, a lip surface elevation offset portion, and a slab floor surface finishing portion. The successive portions are joined to each other and have a continuity from the outer extremity of the edge finisher portion to the outer edge of the slab floor finishing portion. The novel hand tool is typically provided with a backing plate and with a wooden handle, or the like, attached to the backing plate over the lip surface finishing portion.

The foregoing and other advantages of the invention will become apparent from the following disclosure in which a preferred embodiment of the invention is described in detail and illustrated in the accompanying drawings. It is contemplated that variations in procedures, structural features and arrangement of parts may appear to the person skilled in the art, without departing from the scope or sacrificing any of the advantages of the invention.

DETAILED DESCRIPTION OF THE INVENTION

Figure 1:
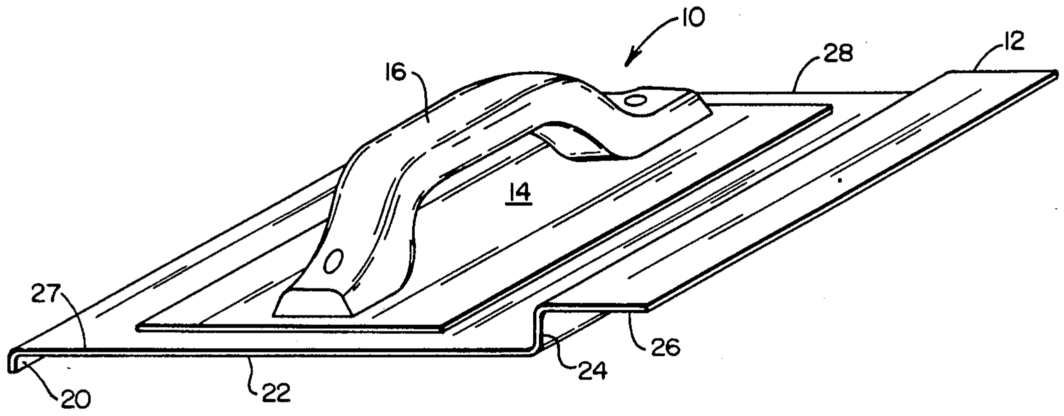
FIG. 1 is a perspective view of the novel concrete slab surface finishing hand tool of this invention.

In the drawing, FIG. 1, the improved hand tool of this invention is designated generally as 10. Such tool is comprised of a working plate-like member 12 with particular edge and surface features, a backing plate 14 spot welded to the working plate 12, and a conventional wood handle 16 secured to the backing plate 14 by threaded fasteners or their equivalent. The working plate member 12 is a continuous plate-like structure and is provided with an edger finishing portion 20, a lip surface finishing portion 22 continuing from the edger portion 20, a lip surface offset elevation portion 24 which generally is perpendicular to the lip surface finisher portion 22, and a slab floor finisher portion 26 which is continued from lip surface offset 24.

The handle 16 is located between edge finishing portion 20 and lip surface offset portion 24 with the longitudinal axis parallel to the edge 20 and the offset portion 24. With the handle in this position, the tool 10 can be readily tilted from one end 27 and the other end 28 to move the tool in longitudinal operating strokes without undue tilting from edge to edge.

Figure 2:
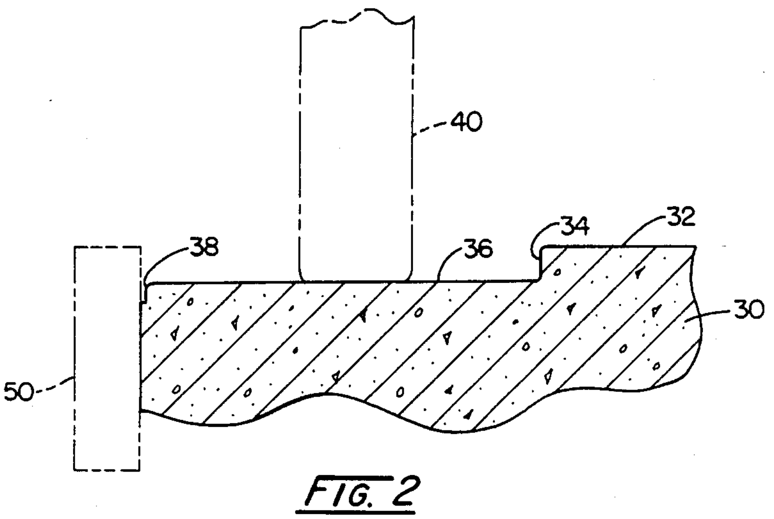
FIG. 2 is a sectional view of a concrete slab provided with a ledge lip surface area made by using the hand tool of this invention.

FIG. 2 illustrates a section taken through a concrete floor slab 30 which has been finished using the hand tool of this invention. Such slab 30 is comprised in its door opening portion with a floor surface 32, a lip offset 34, and a lip surface 36 with integral lip edge 38. FIG. 2 also illustrates, in phantom lines, the position of an overhead door 40 which would co-operate with the lip of the floor slab, and a temporarily located edge form 50 used in finishing the slab at its edge portion.

When using the finishing hand tool of this invention, it is necessary to first finish the edge of the slab following troweling, by first screeding the excess material from the lip surface area 36. After this is accomplished, the hand tool is drawn longitudinally (i.e. parallel to the plane of the floor opening)across the area with tool edge finishing portion 20 in contact with edge form 50. The leading end 27 or 28 is raised slightly to prevent dragging or digging in. The uniform drawing of the hand tool along the form 50 provides the slab with a smooth depressed lip surface 36 extending from the slab edge 38 with an offset 34 and with a finished floor surface 32.

It will be apparent that the tool of this invention has important use in the concrete finishing industry since it reduces the amount of time required to obtain a good finishing job and since it provides a uniform lip depression from the floor elevation with a lesser degree of skill on the part of the operator.

The tool is relatively inexpensive to manufacture and easily formed and assembled from commonly available materials such as steel, stainless steel, or aluminum.

It will be apparent to those skilled in the art from the foregoing that numerous improvements and changes can be made in the embodiments described of the invention without departing from the true scope of the invention. Accordingly, the foregoing disclosure is to be construed as illustrative and not in a limiting sense with the scope of the invention being defined by the appended claims.

What is claimed is:

1. A hand tool for finishing the edge of a concrete slab with an integral lip, comprising, in combination:

(a) a flat floor surface working area;

(b) a lip offset surface working area joined to and extending at right angles from said flat floor surface working area, (c) a flat lip surface working area joined to and extending at right angles from said lip offset surface working area and being oriented substantially parallel to said floor surface working area; and (d) an edge surface working area joined to said lip surface working area, said working areas being formed from a continuous piece of sheet metal.

2. The invention defined by claim 1 wherein said continuous piece of sheet metal is stainless steel.

3. A hand tool for finishing the lip surface of a concrete slab surface in which the lip is formed integrally with the slab surface and connected by an elevation offset, including a continuous sheet-like troweling member, comprising in combination:

(a) an edge surface portion formed to join (b) a flat lip surface portion extending laterally toward the elevated slab surface floor;

(c) with a lip surface offset elevation portion joined to and extending substantially perpendicular to said flat floor surface area and said flat lip surface area, the flat lip surface finishing portion being oriented substantially parallel to the floor surface; and (d) a flat floor surface area extending from the lip surface offset portion.

4. A tool constructed according to claim 3 wherein the continuous piece of sheet metal is stainless steel.

5. A tool according to claim 3 wherein a handle is provided and attached to the upper nonworking surface of the tool.

6. A tool according to claim 5 wherein the handle is longitudinally disposed relative to the edges and the elevation offset portion.

7. A tool according to claim 6 wherein the handle is positioned over the flat lip surface portion.

* * * * *